(12) United States Patent
Prock

(10) Patent No.: US 7,428,843 B2
(45) Date of Patent: Sep. 30, 2008

(54) MULTI-FUNCTION DIGITAL PRESSURE MEASURING DEVICE

(75) Inventor: Jerry Louis Prock, Grand Junction, CO (US)

(73) Assignee: JDL Instruments, Inc., Commerce City, CO (US)

( * ) Notice: Subject to any disclaimer, the term of this patent is extended or adjusted under 35 U.S.C. 154(b) by 722 days.

(21) Appl. No.: 11/050,176

(22) Filed: Feb. 3, 2005

(65) Prior Publication Data

US 2006/0169745 A1    Aug. 3, 2006

(51) Int. Cl.
*A47J 36/02*    (2006.01)

(52) U.S. Cl. .......................... 73/700; 228/102

(58) Field of Classification Search ............ 73/700; 228/102

See application file for complete search history.

(56) References Cited

U.S. PATENT DOCUMENTS

| | | | |
|---|---|---|---|
| 4,884,410 A | 12/1989 | Bell et al. | |
| 5,062,898 A | 11/1991 | McDermott et al. | |
| 5,213,769 A | 5/1993 | Whitlock | |
| 5,278,388 A | 1/1994 | Huang | |
| 5,317,126 A | 5/1994 | Couch, Jr. et al. | |
| 5,440,918 A | 8/1995 | Oster | |
| 6,029,361 A | 2/2000 | Newman | |
| 6,210,492 B1 | 4/2001 | Wilson, III | |
| 6,234,224 B1 | 5/2001 | Schultz, Jr. | |
| 6,783,054 B1 * | 8/2004 | Pregeant et al. | 228/102 |
| 2003/0025000 A1 | 2/2003 | Schmon et al. | |

* cited by examiner

*Primary Examiner*—Andre J Allen
(74) *Attorney, Agent, or Firm*—H. Kenneth Johnston, II

(57) ABSTRACT

A multi-function digital pressure measuring device and welding torch having an outlet nozzle with first and second gas inlets with valves. The pressure measuring device having a body with a first gas chamber and a first inlet and a first outlet where the first inlet is connectable to a first gas supply line and the first outlet is connectable to the first gas inlet of the nozzle to permit gas to pass through. The body further having a second gas chamber with a second inlet and a second outlet where the second inlet is connectable to a second different gas supply line and the second outlet is connectable to the second gas inlet of the nozzle to permit gas to pass through. A display attached to the body and a sensor for measuring pressure associated with the first and second gas chamber. A microprocessor connected to the display and sensor, the microprocessor functioning to calculate elapsed time and pressure for display, thereby providing a welder with an accurate preheat indicator of the materials to be welded. The microprocessor can record the length of service of an external component such as a flashback arrestor associated with the torch.

11 Claims, 4 Drawing Sheets

MULTI-FUNCTION DIGITAL PRESSURE MEASURING DEVICE

BACKGROUND OF THE INVENTION

This invention relates in general to a Thermite welding process and a multi-function digital pressure measuring device used with a welding torch during the process. More specifically, the invention relates to the regulation and display of the gas pressures to the torch head and tracking the amount of time required for the preheat process during Thermite welding. Numerous applications exist in the welding field wherein the user desires to monitor the gas pressure at the torch rather than just at the pressure regulator located back at the tank. One reason is due to the substantial pressure drop that occurs when using a long hose between the tank and the torch head as seen in many railroad rail welding applications.

Thermite welding is utilized to join railroad tracks together into a single length of track The objective of Thermite welding of rails is to properly and permanently join two pieces of rail, end to end, with a butt weld. This is done by casting molten steel into refractory molds that have been placed around the spacing between the two rails.

During this process the rails must be preheated to a minimum of 1100 to 1800 degrees Fahrenheit. To obtain the proper preheat, welders us a mixture of oxygen and propane. A line pressure of 65 psi is required for oxygen while the propane line pressure is maintained at 15 psi. It is critical to maintain the proper pressures during preheat of the Thermite weld in order to obtain the proper weld. Since the temperature of the weld is not directly measured it is calculated to be in the range necessary to provide a good weld by a welder knowing both the pressure of the oxygen and propane at the torch head and the length of time of the preheat. If the preheat temperature isn't sufficient, the weld will be flawed and will be required to be redone. Preheating is a timed consideration based on maintaining the gas pressures as specified. Generally, the preheating required is a minimum of 5 minutes. One of the problems is that currently the welders use small inaccurate analog gauges to assure line pressure. These gauge are often damaged as the welding gas hoses are dragged from place to place and even in some cases driven over by vehicles. It has been determined that the best way to ascertain that the appropriate temperature has been obtained is by timing the preheat process at the proper gas pressures. Generally, a welder uses a stop watch to keep track of the preheat time. However, the stopwatch is often lost, broken, or just forgotten. The welder then uses a wrist watch or merely guesses as to the time elapsed during the preheat. Either method is unacceptable. If the welder has guessed at the time and waits longer than necessary, unnecessary amounts of oxygen and propane are expended which drive up the cost of the weld. If the welder guessed at a time too short then a flawed weld will occur, which again drives up the cost of the weld as it has to be redone.

Another problem with the currently used analog gauges is that they are not easily observed during the welding process and are inherently inaccurate. In an attempt to overcome this problem, larger and more accurate analog gauges were used. However, due to their size and weight they are also often broken.

Additionally, another problem in the field of welding is the hazard presented by a 'flashback'. Flashback can occur if the torch is not properly turned off. The flame travels up the hose connecting the torch to the tank of gas and ignites the entire tank Obviously, such events are extremely dangerous. To prevent flashbacks, a device known as a "Flashback Arrestor" is installed on the hose at the welding torch. These devices are common in the industry and available from numerous welding supply manufacturers. However, they have a limited life and should be replaced on a regular basis. For example, several railroads require that the Flashback Arrestor be replaced every year. It is difficult to track the length of time the Flashback Arrestor has been in use and insure that it is replaced before it becomes ineffective. A multi-functional digital pressure measuring $6(b)$ is attached to flashback arrester 53 so that it is replaced before it becomes ineffective.

U.S. Pat. No. 5,278,388 to Huang teaches the use of a discharge passage when pressure exceeds a predetermined pressure to maintain constant pressure at a welding head. However, it doesn't eliminate the problem with the low pressure. U.S. Pat. No. 5,317,126 to Courch, Jr., et al. uses an experimental pressure gauge to check the nozzle pressure, but such would be impractical and cumbersome.

There are numerous devices that have inline pressure gauges. However, these are the same type of gauges currently being used. Examples are shown in U.S. Pat. No. 6,029,361 to Newman, U.S. Pat. No. 5,062,898 to McDermott et al., U.S. Pat. No. 4,884,410 to Bell et al, and U.S. Pat. No. 5,440,918 to Oster.

U.S. Pat. No. 6,210,492 to Wilson III shows an inline analog pressure gauge which is similar to that currently in use in the Thermite welding process.

U.S. Publish Patent Application No. 2003/0025000 to Schmon et al., shows digital read out of pressure in the handle of the paint spray gun which is not easily readable during usage. One must stop spraying to check the air pressure which in and of itself is not desirable in the current application as it is necessary to know both that the time and that the pressure has been maintained during the preheat process.

SUMMARY OF THE INVENTION

The object of the present invention is to provide a multi-function pressure measuring device that is durable and provides actual line pressures at or near the welding torch and provides the user preheat time and the remaining life of the flashback arrestor.

It is therefore a principal object of this present invention to provide an improved multi-function digital pressure measuring device for monitoring gas pressures that is durable and easily readable by the user.

Another principal object of this present invention is to provide stopwatch capabilities within the multi-function digital pressure measuring device to provide accurate preheat times.

A further object of the present invention is to provide a calendar function that alerts the user that the flashback arrestor requires replacement Another object of the present invention is to provide a temperature monitor capable of correcting the gas pressure readings based on the temperatures of the gases within the device allowing the user to correct the flow to the needed pressure.

A yet further object is to provide all the foregoing advantages utilizing currently available technology and products.

These and other features and advantages of the present invention will be more fully understood from the following detailed description which should be read in light of the accompanying drawings.

DETAILED DESERTION OF THE DRAWINGS

Figure 1:
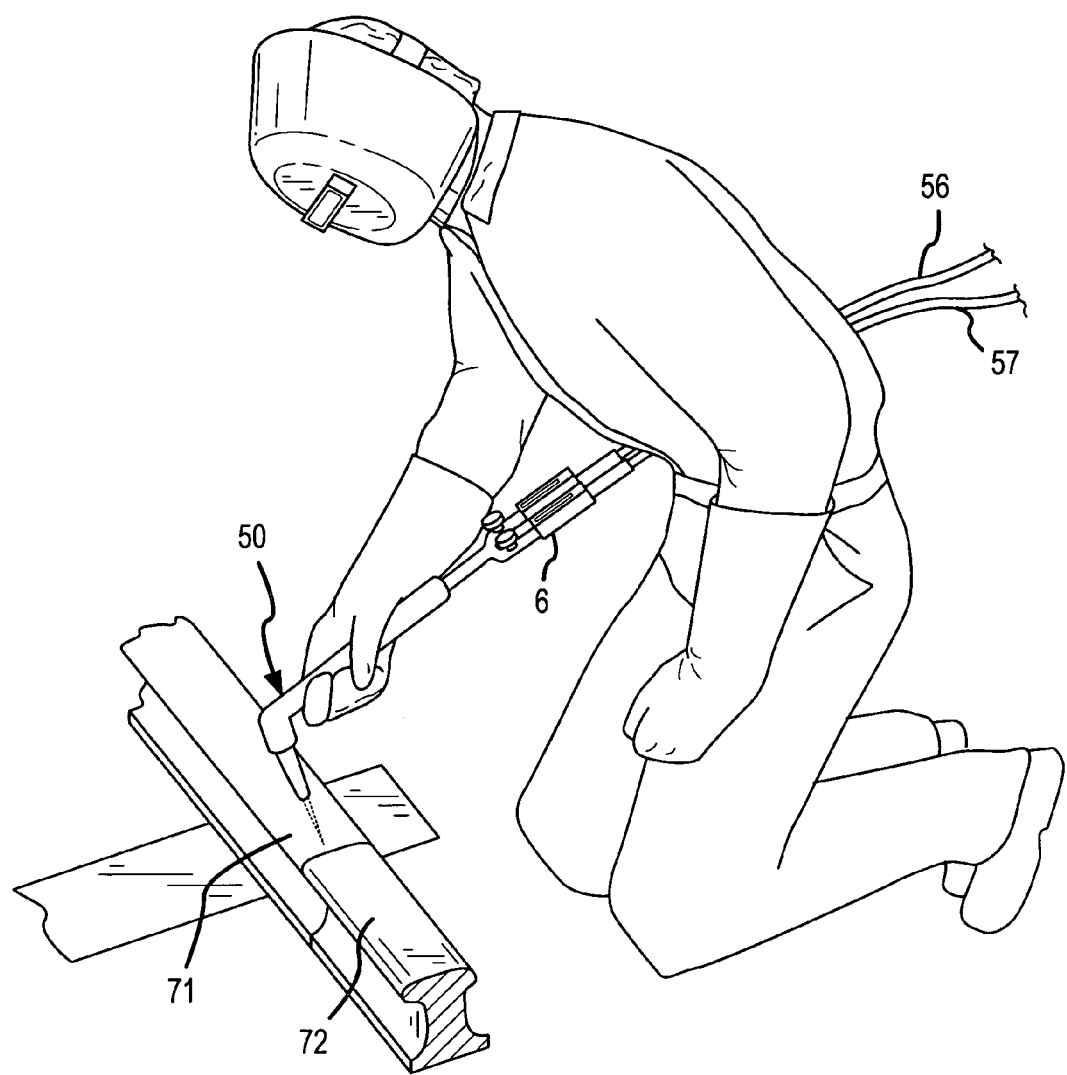
FIG. 1 is perspective view of the present invention in use.
Figure 2:
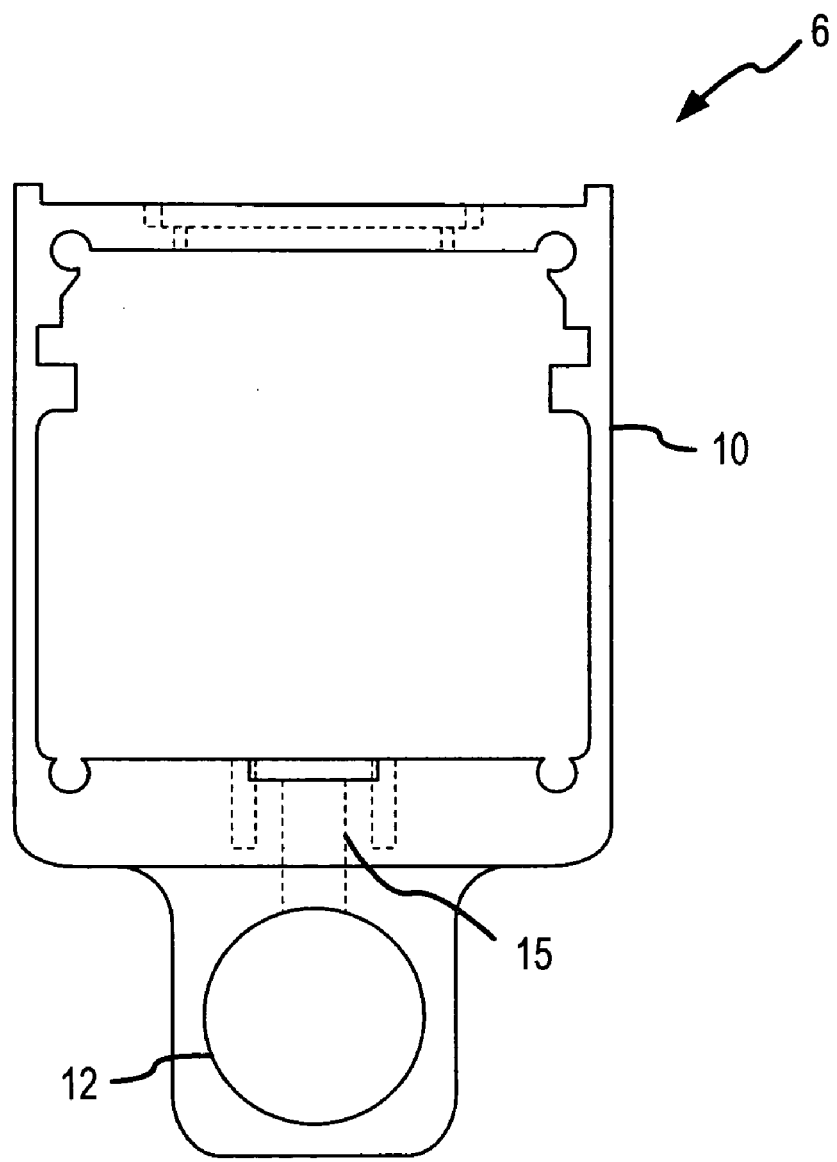
FIG. 2 is a cross-section view of the housing of the present invention.
Figure 3:
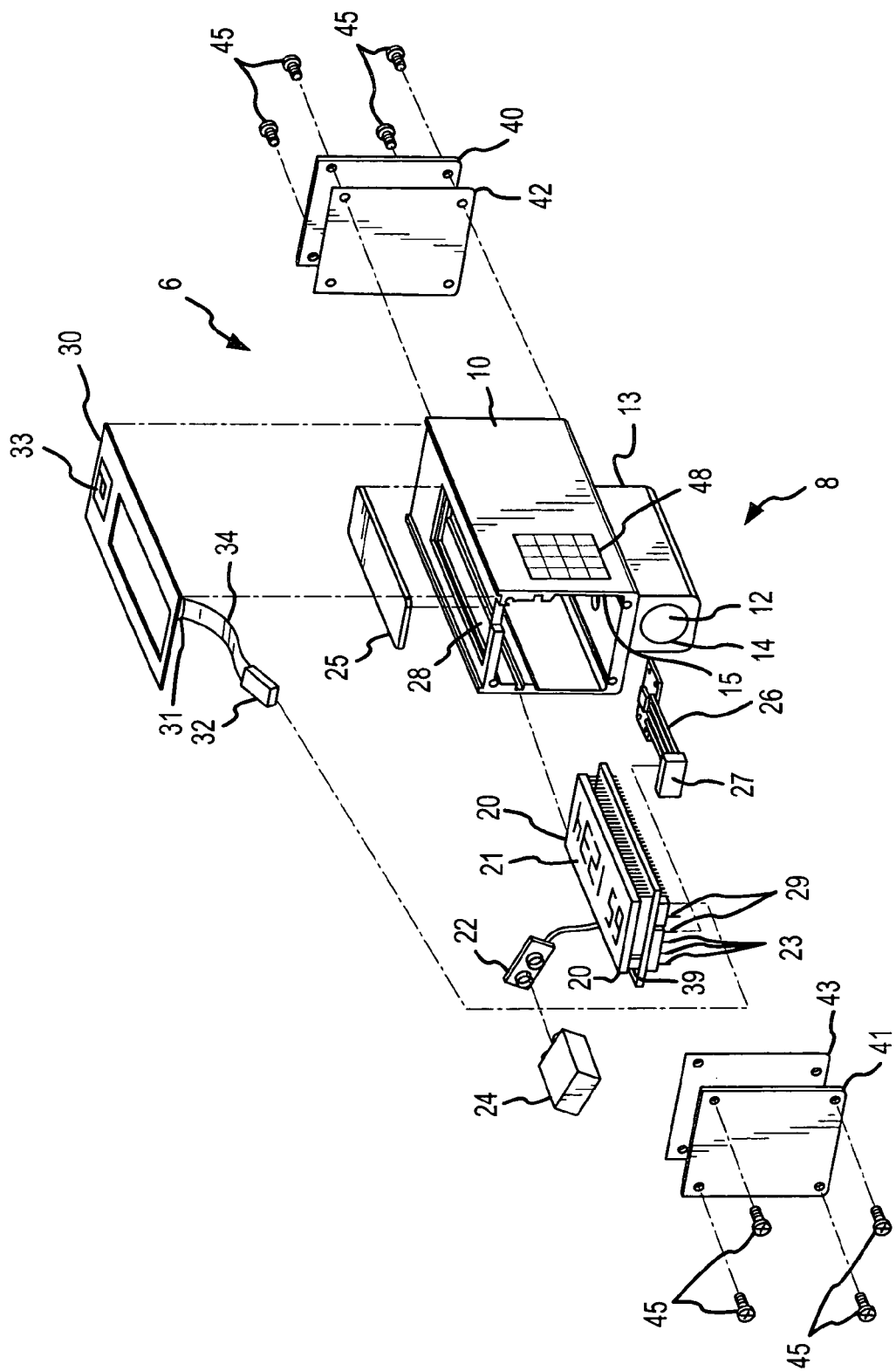
FIG. 3 is a segmented view of the present invention.

Referring now to the drawings, it is seen that the multi-function digital pressure measuring device 6 is comprised of a housing 10 having a gas chamber 12 with an inlet 13 and outlet 14 and a pressure/temperature port 15 allowing a gas to pass through the gas chamber 12. A pressure/temperature transducer 26 is affixed over the pressure port 15 and is interconnected to a multi-function microprocessor 20 by connector 27 and pins 23. The inlet 13 is threaded and may be removably coupled to a connector 62, 63 attached to a flashback arrestor 54, 53 and then to a gas supply lines 56, 57. Outlet 14 is also threaded so that it may be removably attached via connector 58, 59 to a welding torch 50.

There are numerous microprocessors available over the counter, but the one selected is the ATMEL AT mega 169. The ease of programming of any microprocessor and it compactness would determine its desire for usage and there are several known microprocessors that meet this criteria The selected microprocessor has a built in LCD converter, an 8 channel analog to digital converter (not shown) and general input and output control pins 23. The ATMEL AT mega 169 microprocessor was chosen because it also supports a real-time clock function and several power down modes that can be used to conserve battery power. The microprocessor 20 is powered by a 9.6 volt battery 24 which is connected to the microprocessor 20 by connector 22. Connector 22 is the standard connector for a 9.6 volt battery used on most battery powered children's toys requiring such a power source. Additionally the battery is rechargeable via a solar collector panel 48 incorporated into the housing 10.

Microprocessor 20 is affixed within housing 10 such that the display 21 is readable through window 28 when in use. A transparent cover 25 is secured in place over the display 21 by the activation pad assembly 30. During assembly, a fastening material 31 such as a Silicone RTV is placed on the underside at the outer edges of the activation pad 30 affixing the activation pad assembly 30 and cover 25 in place.

Activation pad assembly 30 includes an operation pad 33 connected via ribbon 34 and connector 32 to input pins 29 on the bottom of microprocessor 20. The ribbon 34 and connector 32 are contained within the housing/body 10.

To protect the components of the multi-function digital pressure device 8, seal 42 and seal 43 are held in place by end cap's 40 and 41, respectively, and secured by fasteners 45 to housing 10. In operation, the multi-function digital pressure device 8 is turned on by depressing the pad 33 and the pressure of the gas passing through the gas chamber 12 is measured by the pressure/temperature transducer 26 and shown on display 21. Depressing the pad 33 a second time starts the stop watch function of the microprocessor 20 and it continues to run until pad 33 is depressed a third time stopping the function. During this period, the running time is shown on display 21 and when stopped the elapsed time is shown on display 21.

Depressing pad 33 down for three seconds or longer will display the number of days that a specific or critical part of the welding process has been in service. For example, a flashback arrestor may be required to be replaced every 6 months and this can be tracked through the use of the multi-function digital pressure device 8. This function may be reset by replacing the battery 24 or by depressing a reset button 39 located near the battery 24. Upon releasing of pad 33, after checking the time in use, the temperature of the gas within the gas chamber 12 of the multi-function digital pressure device 8 will be shown on the display 21.

Figure 4:
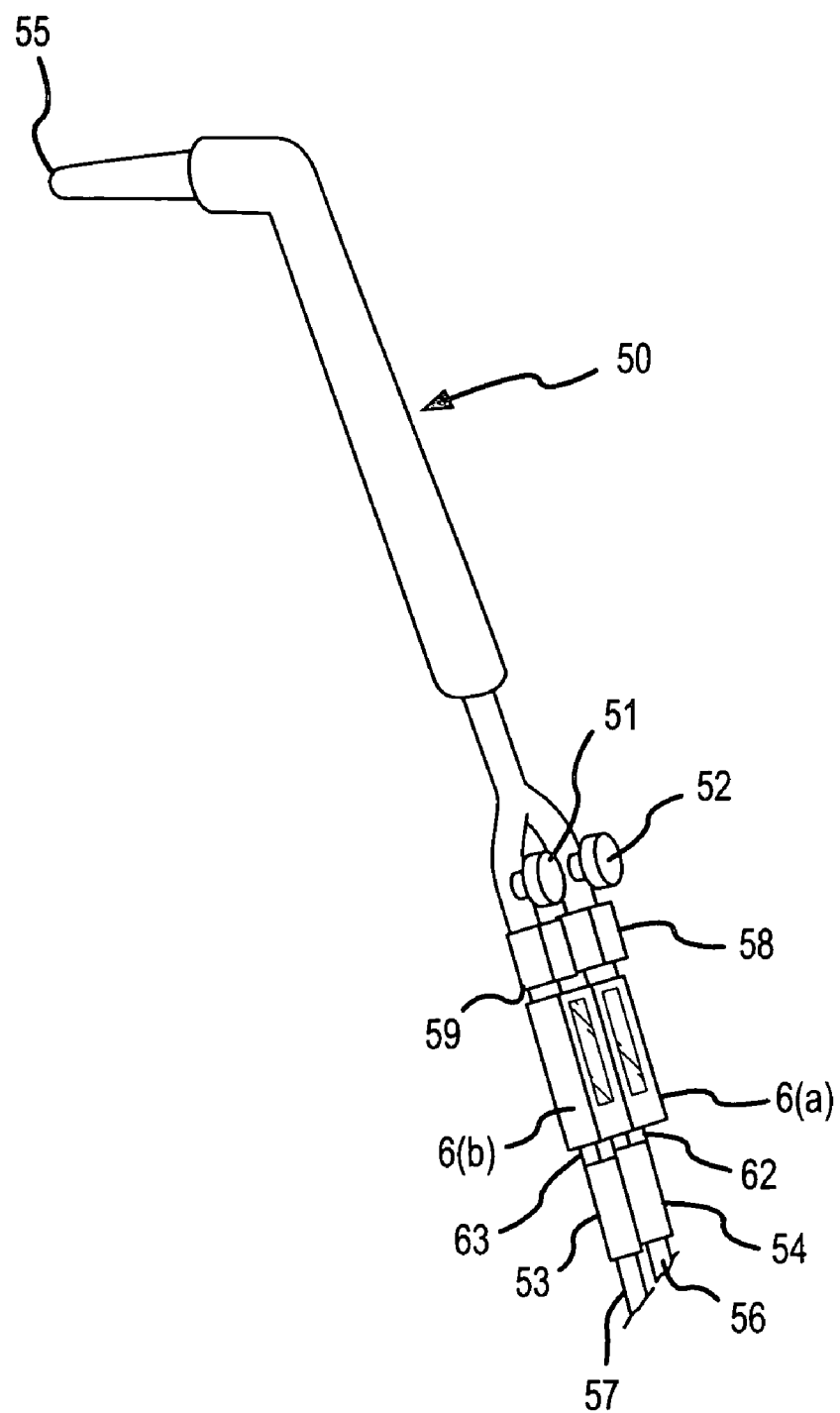
FIG. 4 is a perspective view of the present invention attached to a Thermite welding torch.

In FIG. 4, a Thermite welding torch 50 with an outlet 55 is shown. The torch includes two gas inlets to which are attached to flashback arrestors 53 and 54. As previously discussed, flashback can occur if the torch is not properly turned off and the flame travels up the hose connecting the torch to the tank of gas to ignite the entire tank. Flashback arrestors have a limited life and should be replaced on a regular basis. For example, several railroads require that the flashback arrestor by replaced every year. It is difficult to track the length of time the flashback arrestor has been in use and ensure that it is replaced before it becomes ineffective. There is no easy way to track the life of the flashback arrestor without extensive amounts of documentation and control. The present invention provides a method of tracking the aging of the flashback arrestors 53, 54 as the dock in the multi-function digital pressure measuring device 6 attached to each flashback arrestor is set and reset each time a new arrestor is installed.

Control valves 51 and 52 function to adjust the amount of each gas being mixed. A multi-function digital pressure measuring device 6(a) is attached at its inlet end to flashback arrestor 54 and then to gas line 56. At its outlet end the multi-function digital pressure measuring device 6(a) is attached to torch 50 via connector 58. A multi-function digital pressure measuring device 6(b) is attached at its inlet end to flashback arrestor 53 and then to gas line 57. At its outlet end the multifunction digital pressure measuring device 6(b) is attached to torch 50 via connector 59.

The invention further involves a method for obtaining a proper preheat temperature of parts (71,72) to be welded together via a torch. To do this one must first (a) attach a first multifunction digital pressure measuring device 6 with a display and timer to the welding torch 50 and a first gas supply line 56; (b) attach a second multifunction digital pressure measuring device 6 with a display to the welding torch 50 and a second different gas supply line 57; (c) read the display on the first multifunction digital pressure measuring device to determine that the first gas pressure at the torch is at the desired and correct value of 65 psi; (d) read the display on the second multi-function digital pressure measuring device to determine the second gas pressure at the torch is at the desired and correct value of 15 psi; (e) open the gas valves on the torch to permit first and second gases to flow therethrough and igniting the torch; (f) direct the torch at the parts to be welded and activate the timer on the first multi-function digital pressure measuring device; and then (g) monitor the pressure readings on each display for a predetermined time period of 5 minutes which is indicated by the timer. In operation, the first gas is oxygen and the second gas is propane.

While the invention has been particularly shown and described with reference to embodiments thereof, it will be appreciated by those skilled in the art that various change in form and detail may be made without departing from the spirit and scope of the invention.

What I claim:

1. A multi-function digital pressure measuring device for a welding torch comprising:
   a body having a gas chamber with an inlet and an outlet where the inlet is connectable to a gas supply line and the outlet is connectable to a welding torch to permit gas to pass through;
   a display attached to the body;

a sensor for measuring pressure associated with the gas chamber; and a microprocessor connected to the display and sensor, the microprocessor including means to calculate elapsed time and pressure for display, thereby providing a welder with an accurate preheat indicator of the materials to be welded.

2. A multi-function digital pressure measuring device according to claim 1, wherein the sensor can also measure the temperature of the gas passing through the gas chamber.

3. A multi-function digital pressure measuring device according to claim 1, wherein the microprocessor is connectable to a removable power source.

4. A multi-function digital pressure measuring device according to claim 1, wherein the multi-function microprocessor includes a clock which can be reset.

5. A multi-function digital pressure measuring device according to claim 1, wherein the display simultaneously indicates time and pressure.

6. A multi-function digital pressure measuring device according to claim 3 wherein the power source is a battery.

7. A multifunction digital pressure measuring device according to claim 6, wherein the battery is rechargeable via a solar source.

8. A multi-function digital pressure measuring device according to claim 1, further including a flashback arrestor associated therewith.

9. A multi-function digital pressure measuring device according to claim 8, wherein the microprocessor records the length of service of a flashback arrestor.

10. A multi-function digital pressure measuring device according to claim 1, wherein the microprocessor can record the length of service of a flashback arrestor associated with the torch.

11. A multi-function digital pressure measuring device according to claim 1, further including an operation pad associated with the display and the microprocessor, wherein the operation pad is depressed to control what measurements are being displayed.

* * * * *